United States Patent
Chong et al.

(10) Patent No.: US 9,935,933 B2
(45) Date of Patent: *Apr. 3, 2018

(54) SYSTEMS AND METHODS FOR SECURE OPERATION OF AN INDUSTRIAL CONTROLLER

(71) Applicant: General Electric Company, Schenectady, NY (US)

(72) Inventors: Justin Brandon Chong, Salem, VA (US); David Richard Socky, Roanoke, VA (US); Pavan Kumar Singh Thakur, Hyderabad (IN); William Robert Pettigrew, Salem, VA (US); Robert James Boring, Greer, SC (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/214,094

(22) Filed: Jul. 19, 2016

(65) Prior Publication Data

US 2016/0330187 A1 Nov. 10, 2016

Related U.S. Application Data

(63) Continuation of application No. 14/607,297, filed on Jan. 28, 2015, now Pat. No. 9,397,997, which is a
(Continued)

(51) Int. Cl.
*G06F 7/04* (2006.01)
*H04L 29/06* (2006.01)
(Continued)

(52) U.S. Cl.
CPC ............ *H04L 63/08* (2013.01); *G05B 19/048* (2013.01); *G05B 19/414* (2013.01); *H04L 9/321* (2013.01);
(Continued)

(58) Field of Classification Search
None
See application file for complete search history.

(56) References Cited

U.S. PATENT DOCUMENTS 5,774,652 A 6/1998 Smith
6,092,202 A 7/2000 Veil et al.
(Continued)

FOREIGN PATENT DOCUMENTS

CN 1202662 A 12/1998
CN 1338140 A 2/2002
(Continued)

OTHER PUBLICATIONS

Unofficial English Translation of Japanese Search Report issued in connection with corresponding JP Application No. 2013093295 dated Feb. 22, 2017.
(Continued)

*Primary Examiner* — Brandon S Hoffman
(74) *Attorney, Agent, or Firm* — Fletcher Yoder, P.C.

(57) ABSTRACT

A method of securing an industrial control system includes operating the industrial control system in an open mode, wherein communications between a plurality of devices of the industrial control system are unencrypted when the industrial control system is in the open mode. The method includes exchanging security tokens between the plurality of devices of the industrial control system. The method further includes ceasing operating the industrial control system in the open mode and instead operating the industrial control system in a secure mode, wherein the communications between the plurality of devices of the industrial control system are encrypted using the security tokens when the industrial control system is operating in the secure mode.

21 Claims, 3 Drawing Sheets

Related U.S. Application Data continuation of application No. 13/460,794, filed on Apr. 30, 2012, now Pat. No. 8,973,124.

(51) Int. Cl.
    *G05B 19/048*     (2006.01)
    *H04L 9/32*     (2006.01)
    *G05B 19/414*     (2006.01)

(52) U.S. Cl.
    CPC .......... *H04L 9/3213* (2013.01); *H04L 9/3263* (2013.01); *H04L 9/3268* (2013.01); *H04L 63/0428* (2013.01); *H04L 63/0823* (2013.01)

(56) References Cited

U.S. PATENT DOCUMENTS

| | | |
|---|---|---|
| 6,286,085 B1 | 9/2001 | Jouenne et al. |
| 6,449,732 B1 | 9/2002 | Rasmussen et al. |
| 6,668,629 B1 | 12/2003 | Leslie |
| 6,694,434 B1 | 2/2004 | McGee et al. |
| 6,826,690 B1 | 11/2004 | Hind et al. |
| 6,836,396 B1 | 12/2004 | Tignor et al. |
| 7,222,228 B1 | 5/2007 | Stephens, Jr. et al. |
| 7,246,002 B2 | 7/2007 | Healy et al. |
| 7,340,600 B1 | 3/2008 | Corella |
| 7,412,524 B1 | 8/2008 | Gupta et al. |
| 7,535,648 B2 | 5/2009 | Yoshikawa et al. |
| 7,536,548 B1 | 5/2009 | Batke et al. |
| 7,577,848 B2 | 8/2009 | Schwartz et al. |
| 7,649,452 B2 | 1/2010 | Zilberstein et al. |
| 7,877,627 B1 | 1/2011 | Freydel |
| 8,015,791 B2 | 9/2011 | Finkbeiner |
| 8,121,707 B2 | 2/2012 | Karaffa et al. |
| 8,707,032 B2 | 4/2014 | Socky et al. |
| 8,726,372 B2 | 5/2014 | Sahoo et al. |
| 9,135,430 B2 * | 9/2015 | Callaghan ............... G06F 21/33 |
| 2003/0016819 A1 | 1/2003 | Cheng |
| 2003/0135675 A1 | 7/2003 | Pontius et al. |
| 2004/0153644 A1 | 8/2004 | McCorkendale et al. |
| 2005/0076203 A1 | 4/2005 | Thornton et al. |
| 2005/0213768 A1 | 9/2005 | Durham et al. |
| 2006/0253465 A1 | 11/2006 | Willis et al. |
| 2006/0285693 A1 | 12/2006 | Raikar |
| 2007/0093921 A1 | 4/2007 | Braun et al. |
| 2007/0162609 A1 | 7/2007 | Pope et al. |
| 2007/0260116 A1 | 11/2007 | Shigemori et al. |
| 2008/0163182 A1 | 7/2008 | Breault |
| 2008/0168564 A1 | 7/2008 | Lerouge et al. |
| 2008/0175388 A1 | 7/2008 | Okabe et al. |
| 2009/0049430 A1 | 2/2009 | Pai et al. |
| 2009/0077638 A1 | 3/2009 | Norman et al. |
| 2009/0083287 A1 | 3/2009 | Bell et al. |
| 2009/0094250 A1 | 4/2009 | Dhuse et al. |
| 2009/0169006 A1 | 7/2009 | Zick et al. |
| 2009/0171479 A1 | 7/2009 | Oosako |
| 2009/0271504 A1 | 10/2009 | Ginter et al. |
| 2009/0276550 A1 | 11/2009 | Megarity |
| 2009/0319773 A1 | 12/2009 | Frenkel et al. |
| 2009/0328183 A1 | 12/2009 | Frenkel et al. |
| 2010/0036773 A1 | 2/2010 | Bennett |
| 2010/0146588 A1 | 6/2010 | Bergerson et al. |
| 2010/0185857 A1 | 7/2010 | Neitzel et al. |
| 2010/0192208 A1 | 7/2010 | Mattsson |
| 2010/0275039 A1 | 10/2010 | Frenkel et al. |
| 2010/0313264 A1 | 12/2010 | Xie et al. |
| 2011/0039237 A1 | 2/2011 | Skare |
| 2011/0299679 A1 | 12/2011 | Yamaguchi et al. |
| 2012/0030761 A1 | 2/2012 | Baba et al. |
| 2012/0036568 A1 | 2/2012 | Kodama |
| 2012/0159650 A1 | 6/2012 | Cho et al. |
| 2012/0198541 A1 | 8/2012 | Reeves |
| 2012/0226917 A1 | 9/2012 | Wiseman et al. |
| 2012/0240212 A1 | 9/2012 | Wood et al. |
| 2012/0246555 A1 | 9/2012 | Masten |
| 2013/0030765 A1 | 1/2013 | David |
| 2013/0067551 A1 | 3/2013 | Frew et al. |
| 2013/0110298 A1 | 5/2013 | Beveridge |
| 2013/0139242 A1 | 5/2013 | Zhu |
| 2013/0287208 A1 | 10/2013 | Chong et al. |
| 2013/0290729 A1 | 10/2013 | Pettigrew et al. |
| 2013/0291085 A1 | 10/2013 | Chong et al. |
| 2013/0291115 A1 | 10/2013 | Chong et al. |

FOREIGN PATENT DOCUMENTS

| | | |
|---|---|---|
| CN | 1344000 A | 4/2002 |
| CN | 1618060 A | 5/2005 |
| DE | 102008038913 A1 | 2/2010 |
| EP | 0891611 A1 | 1/1999 |
| EP | 1582950 A2 | 10/2005 |
| EP | 1608123 A1 | 12/2005 |
| EP | 1906586 A1 | 4/2008 |
| JP | H03268005 A | 11/1991 |
| JP | 11161321 A | 6/1999 |
| JP | 2001249899 A | 9/2001 |
| JP | 2003134579 A | 5/2003 |
| JP | 2005100164 | 4/2005 |
| JP | 2007061191 | 3/2007 |
| JP | 2008283789 | 11/2008 |
| JP | 2008283792 | 11/2008 |
| JP | 2008284160 | 11/2008 |
| WO | 2005069823 A2 | 8/2005 |
| WO | 2011128993 A1 | 10/2011 |
| WO | 2014042638 A1 | 3/2014 |

OTHER PUBLICATIONS

Unofficial English Translation of Japanese Office Action issued in connection with corresponding JP Application No. 2013093295 dated Mar. 7, 2017.

European Search Report and Opinion issued in connection with corresponding EP Application No. 13166009.4 dated Apr. 24, 2017.

Dierks, T., et al., "The Transport Layer Security (TLS) Protocol Version 1.2; rfc5246.txt", Aug. 1, 2008, pp. 1-104, Switzerland.

Freier, A., et al., "The Secure Sockets Layer (SSL) Protocol Version 3.0; rfc6101.txt," Aug. 13, 2011, pp. 1-67, Switzerland.

Ball, E., et al., "Role-based access control with X.509 attribute certificates," IEEE Internet Computing, Mar. 1, 2003, pp. 62-69, vol. No. 7, Issue No. 2, United States.

Cooper, D., et al., "Internet X.509 Public Key Infrastructure Certificate and Certificate Revocation List (CRL) Profile; rfc5280.txt", May 1, 2008, pp. 1-151.

PCT Search Report and Written Opinion dated Dec. 12, 2013, issued in connection with corresponding WO Application No. PCT/US2013/062522.

Simon et al., RFC 5216: The EAP-TLS Authentication Protocol, Mar. 2008, IETF, pp. 1-34.

Farrell et al., RFC 5755: An Internet Attribute Certificate Profile for Authorization, Jan. 2010, IETF, pp. 1-50.

Okhravi, Hamed; "Data Diodes in Support of Trustworthy Cyber Infrastructure"; Apr. 21-23; Oak Ridge; Tennessee; USA Copyright 2010; pp. 1-4; ACM 978-1-4503-0017-9.

Unofficial English Translation of Chinese Office Action issued in connection with corresponding CN Application No. 201310153717.5 dated Sep. 21, 2016.

Japanese Office Action for JP Application No. 2013-093295 dated Nov. 21, 2017; 7 Pages.

\* cited by examiner

SYSTEMS AND METHODS FOR SECURE OPERATION OF AN INDUSTRIAL CONTROLLER

CROSS-REFERENCE TO RELATED APPLICATION

This application is a continuation of U.S. application Ser. No. 14/607,297, entitled, "SYSTEMS AND METHODS FOR SECURE OPERATION OF AN INDUSTRIAL CONTROLLER," filed on Jan. 15, 2015, which issued as U.S. Pat. No. 9,397,997 on Jul. 19, 2016, which is a continuation of U.S. application Ser. No. 13/460,794, entitled, "SYSTEMS AND METHODS FOR SECURE OPERATION OF AN INDUSTRIAL CONTROLLER," filed on Apr. 30, 2012, which issued as U.S. Pat. No. 8,973,124 on Mar. 3, 2015, which is hereby incorporated by reference in its entirety for all purposes.

BACKGROUND OF THE INVENTION

The subject matter disclosed herein relates to industrial control systems and, more particularly, to securing the operation of industrial control systems.

Industrial control systems, such as automated power generation systems (e.g., wind, water, and gas turbine systems) and automated manufacturing systems (e.g., petroleum refineries, chemical manufacturing plants, and the like) are a common feature of modern industry. For such industrial control systems, an industrial controller may generally control the operation of the system. For example, certain devices in the industrial control system (e.g., sensors, pumps, valves, actuators, and the like) may be controlled by, and may report data to, the industrial controller. Furthermore, the industrial controller may execute instructions (e.g., firmware and/or applications) that may generally enable the industrial controller to control the operation of the industrial control system (e.g., a gas turbine system). These instructions may be provided by the manufacturer of the industrial controller. For example, these instructions may be loaded onto the industrial controller before it is installed in the industrial control system. Additionally, industrial controller may offer several different methods of accessing and/or providing instructions to the industrial controller, such as via a network connection or a local port.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a method of securing an industrial control system includes operating the industrial control system in an open mode, wherein communications between a plurality of devices of the industrial control system are unencrypted when the industrial control system is in the open mode. The method includes exchanging security tokens between the plurality of devices of the industrial control system. The method further includes ceasing operating the industrial control system in the open mode and instead operating the industrial control system in a secure mode, wherein the communications between the plurality of devices of the industrial control system are encrypted using the security tokens when the industrial control system is operating in the secure mode.

In another embodiment, a method of securing an industrial control system includes transmitting unencrypted data between a first device and a second device of an industrial control system. The method includes generating a first security token and a second security token for the first and second devices, respectively, using at least one processor of the industrial control system. The method also includes exchanging the first and second security tokens between the first and second devices of the industrial control system. The method further includes ceasing transmitting unencrypted data between the first and second devices, and subsequently only transmitting encrypted data between the first and second devices, wherein the encrypted data is encrypted based on the first and second security tokens.

In an embodiment, a system includes an industrial control network comprising a plurality of devices that includes an industrial controller. The plurality of devices is configured to exchange respective security tokens between the plurality of devices over the industrial control network and to cease exchanging unencrypted data over the industrial control network. Further, the plurality of devices is configured to exchange encrypted data over the industrial control network, wherein the encrypted data is generated based on the respective security tokens.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
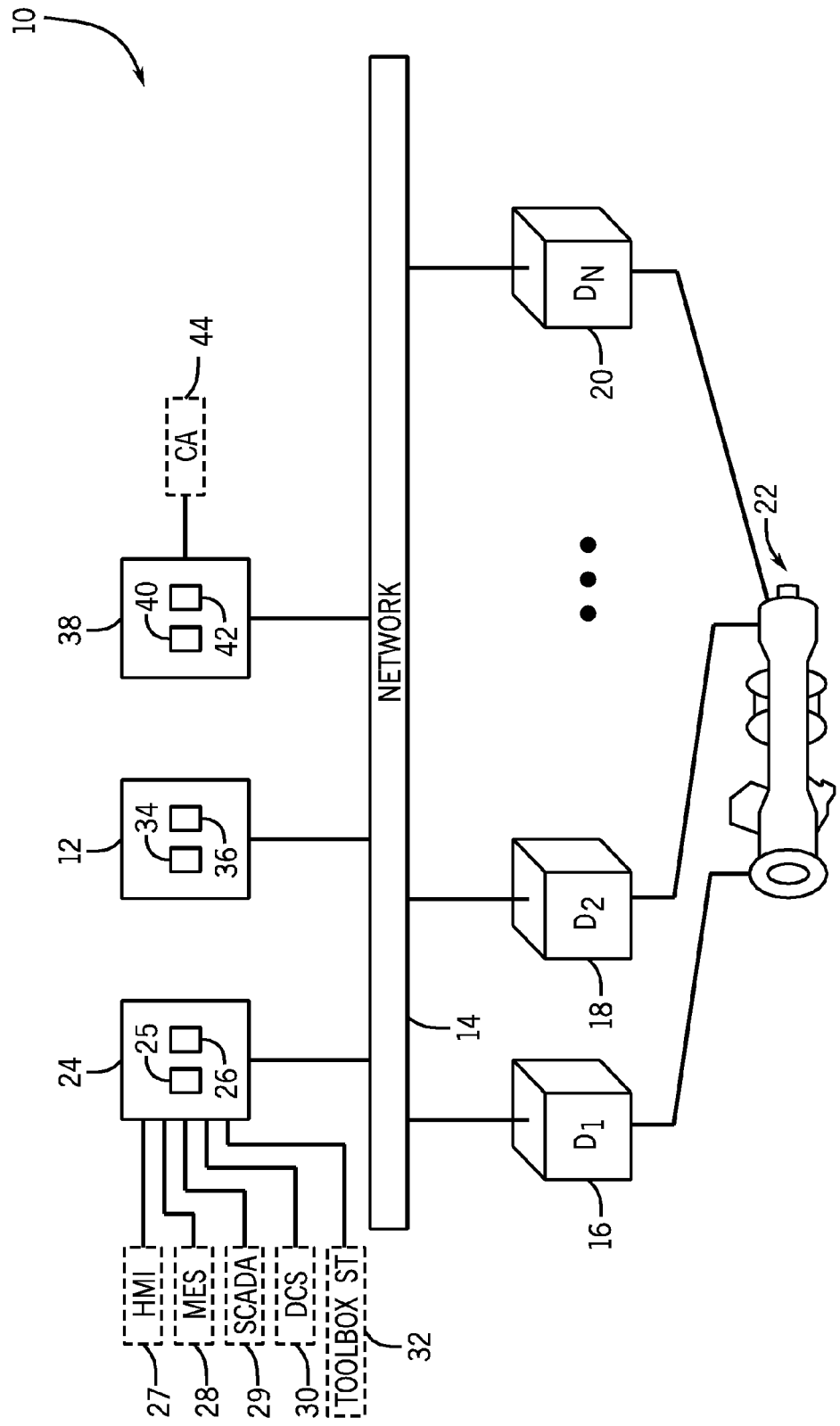
FIG. 1 is a schematic diagram of an embodiment of an industrial control system being operated by an industrial controller, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Additionally, as used herein, the terms "executable file" and "binary file" may both generally refer to a computer-readable file that that includes instructions (e.g., binary instructions) that may be performed by a processor (e.g., the processor of an industrial controller). Furthermore, as used herein, the term "software developer" may generally refer to an organization which develops, maintains, and/or provides instructions in the form of source code and/or executable files to control the operation of industrial controllers. Also, as used herein, the term "whitelist" may refer to a file which includes a list identifying executable files that are authorized to run on an industrial controller. Additionally, the term "authorized" may be used herein to refer to an executable file that is verified to be from a trustworthy source (i.e., the software developer) and whose contents are verified as being the same as when it was provided by the trustworthy source.

It may generally be desirable to operate an industrial controller of an industrial control system in a secure mode. That is, it may generally be desirable to impose a number of restrictions on the typical behavior or operations of the industrial controller in order to improve the overall security of the industrial control system. For example, as set forth in detail below, operating the industrial controller in a secure mode may generally block the execution of unauthorized executable files and/or block access to the industrial controller by unauthorized persons or systems. Accordingly, the presently disclosed systems and methods enable the operation of an industrial controller in a secure mode, in which the secure mode generally blocks unauthorized access to the industrial controller. Additionally, the presently disclosed embodiments enable the industrial controller to move from an open mode (e.g., without restrictions) to the secure mode (e.g., with additional security restrictions) by gradually applying a number of security restrictions to the industrial controller. By enabling the industrial controller to operate in a secure mode that persists across the various activities of the industrial controller (e.g., power cycles and software upgrades), the presently disclosed embodiments generally provide an industrial control system having reduced risk of unauthorized access and/or the execution of unauthorized instructions.

With the foregoing in mind, FIG. 1 is a schematic diagram illustrating an industrial control system 10. The illustrated industrial control system 10 includes an industrial controller 12 (e.g., a Mark™Vie, or any other Mark™ industrial controller available from General Electric of Schenectady, N.Y.) that may be configured to operate in at least an open mode and a secure mode, in accordance with aspects of the present disclosure. Additionally, the industrial controller 12 may be coupled to a network 14 to control the operation of a number of field devices 16, 18 and 20. For example, the illustrated industrial controller 12 receives sensory data from a number of field devices 16, 18, and 20 (e.g., temperature sensors, pressure sensors, voltage sensors, control valves, actuators, or similar field devices for an industrial control system) via the network 14 to monitor and control the operation of a gas turbine system 22. In other embodiments, rather than a gas turbine system 22, the system being monitored and controlled by the industrial control system 10 may include, for example, any automated manufacturing systems (e.g., petroleum refinery systems, chemical production systems, gasification systems, or similar automated manufacturing system) or automated power generation systems (e.g., power plants, steam turbine systems, wind turbine systems, and similar automated power generation systems). For example, in an embodiment, a gasification system may include a gasifier configured to gasify a carbonaceous feedstock to generate a synthetic gas, a gas treatment unit is configured to process the synthetic gas to remove undesirable elements (e.g., acid gases), a combustor configured to combust the synthetic gas to drive a turbine, and a generator coupled to the turbine configured to produce electrical power. In such an embodiment, the industrial controller 12 may monitor and control the various components of the gasification system (e.g., the gasifier, gas treatment unit, combustor, and turbine) using at least the field devices 16, 18, and 20.

For the illustrated industrial control system 10, the field devices 16, 18, and 20 are communicatively coupled to the industrial controller 12 (e.g., via the network 14) while monitoring and controlling various aspects and parameters of the operation of the gas turbine system 22 (e.g., monitoring the temperature in a combustor of the gas turbine system, controlling the voltage output of an electrical generator coupled to a shaft of the gas turbine system, regulating a flow of a fuel into the combustor, controlling a steam input of a heat recovery steam generator (HRSG), and the like). It should be appreciated that the illustrated industrial control system 10 represents a simplified industrial control system, and that other industrial control systems may include any suitable number of industrial controllers 12, networks 14, networking devices, field devices, etc., to monitor and control portions of any automated system 22.

In the depicted embodiment, industrial controller 12 may use the network 14 for communicating with and controlling any one of the field devices 16, 18, or 20. For example, the industrial controller 12 may reside in an industrial plant and may be configured to adjust one or more process conditions related to the devices 16, 18, 20. The network 14 may be any electronic and/or wireless network suitable for enabling communications, and may include fiber media, twisted pair cable media, wireless communications hardware, Ethernet cable media (e.g., Cat-5, Cat-7), and the like. Further, the network 14 may include several sub-buses, such as a high speed Ethernet sub-bus suitable for connecting components of the industrial control system 10 at communication speeds of 100 MB/sec and upwards. Additionally, the network 14 may include an input/output (I/O) network, such as an I/O network conforming to the Institute of Electrical and Electronics Engineers (IEEE) 802.3 standard. The network 14 may also include an H1 network sub-bus suitable for connecting components of the industrial control system 10 at communications speeds of approximately 31.25 Kb/sec. The sub-buses may intercommunicate with each other, for example, by using linking devices or gateways, such as those gateways available under the designation FG-100 provided by softing AG, of Haar, Germany, and/or I/O packs available from General Electric Co. of Schenectady, N.Y. Indeed, a number of interconnected sub-buses of the network 14 may be used to communicate amongst the components of the industrial control system 10.

The industrial controller 12, including memory 34 and processor 36, may execute instructions (e.g., binary instructions in executable files) to generally control the operation of the industrial control system 10. For example, the memory 34 of the industrial controller 34 may include one or more files including binary instructions that may be performed by the processor 36 in order to control and monitor the field devices 16, 18, and 20 disposed within portions of the gas turbine system 22. These executable files may, for example, be initially installed in the memory 34 of the industrial controller 12 by the manufacturer of the industrial controller 12 before the industrial controller 12 is installed in the industrial control system 10. Furthermore, the executable files stored in the memory 34 of the industrial controller 12 may occasionally be updated, for example, to augment the features of previous software versions as well as improve performance.

Also communicatively coupled to the industrial controller 12 (e.g., via the network 14 or another suitable network) is the device 24, including a memory 25 and a processor 26, which may host a human machine interface (HMI) system 27, a manufacturing execution system (MES) 28, a supervisor control and data acquisition (SCADA) system 29, a distributed control system (DCS) 30, or similar interface systems. In particular, in certain embodiments, the device 24 may host a configuration application or tool, such as ToolboxST™ (represented by element 32), available from General Electric Co., of Schenectady, N.Y. In general, the aforementioned systems may provide one or more interfaces by which a user may monitor and control the operation of the industrial controller 12. For example, the HMI 27 and/or the ToolboxST 32 may provide a user interface through which various parameters of the industrial control system 10 (e.g., stored in the memory 34 of the industrial controller 12) may be forced or set. By further example, the HMI 27 and/or the ToolboxST 32 may include an interface through which the various executable files stored in the memory 34 of the controller 12 may be updated to newer versions. In certain embodiments, the aforementioned systems may be hosted on a single device 24, while, in other embodiments, they may each be installed on one or more devices in the industrial control system 10.

Also, a security server 38 having a memory 40 and a processor 42 may be communicatively coupled to the industrial controller 12 and the device 24 (e.g., via the network 14 or another suitable network) and may host a certificate authority (CA) 44. The certificate authority 44 hosted by security server 38 may generally issue and revoke certificates among the industrial control system 10 to, for example, enable secure communications between the industrial controller 12 and device 24. It should be appreciated that, while only a single security server 38 and certificate authority 44 is illustrated in FIG. 1, in certain embodiments, the industrial control system 10 may have 1, 2, 3, 4, or more security servers 38 and/or certificate authorities 44.

Generally speaking, certificates are electronic documents that may use digital signatures to verify the identity of a certificate holder. For example, it may be desirable for the various components of the control system 10 to verify each other's identities using mutual authentication or other security techniques (e.g., two-factor authentication). In general, mutual authentication may refer to a first certificate holder (e.g., device 24) verifying the identity of a second certificate holder (e.g., industrial controller 12), and reciprocally, the second certificate holder subsequently verifying the identity of the first certificate holder (e.g., over the network 14). Accordingly, mutual authentication may reduce the likelihood of unauthorized use of the industrial control system 10.

As such, the disclosed embodiments include systems and methods suitable for securing communication to the industrial controller 12 through the use of mutual authentication (e.g., two-way authentication) using certificates. For example, as discussed in detail below, the device 24 (e.g., the HMI 27 or the ToolboxST 32 running on the device 24) and the industrial controller 12 may acquire respective certificates from the certificate authority 44. Then, for example, when the ToolboxST 32 wants to establish an authenticated communication channel to the industrial controller 12, the two devices may exchange their respective certificates as a part of verifying their respective identities. This authentication may generally reduce or eliminate the possibility of unauthorized use of the device 24 and/or the industrial controller 12. In addition, the device 24 may reciprocally verify the identity of the industrial controller 12 to further improve the security of the industrial control system 10. Furthermore, in addition to this authentication, certain embodiments may also enable the use of encryption to further secure the authenticated communication channel. That is, in certain embodiments, the industrial controller 12 and the device 24 may respectively use a portion of data (e.g., a public key) included in the other device's certificate to encrypt the communication contents so that these contents are not generally readable by other devices in the industrial control system 10.

In addition to securing communication, presently disclosed embodiments may utilize a whitelisting method to verify each executable file stored in the memory 34 of the industrial controller 12 prior to execution. For example, this whitelist file may include a collection of hash key values determined for the authorized executable files in a particular software release. That is, after each executable file is built (e.g., compiled), the executable file may be provided as input to a hash function (e.g., a Cyclic Redundancy Check (CRC) hash function, a Message-Digest Algorithm (MD) hash function, a Secure Hash Algorithm (SHA) hash function, or other suitable hash function) and the hash key value output associated with that executable file may be stored in the whitelist file (e.g., an Extensible Markup Language (XML) file). Furthermore, the whitelist file may be securely provided to the industrial controller (e.g., encrypted prior to packaging and/or transport and decrypted by the industrial controller). The industrial controller, prior to executing a particular executable file, may also provide the particular executable file to the same hash function (e.g., CRC, MD5, SHA-1, or other suitable hash function) and may subsequently determine if the hash key value output from the hash function is included in the whitelist file. If the hash key value is located in the whitelist file, the industrial controller may conclude that the particular executable file is authorized (e.g., from a trustworthy source and unaltered since it was built) and proceed with executing the executable file. If, however, the hash key value is not located in the whitelist file, the industrial controller may block the execution of the particular executable file, and may log the attempt at unauthorized execution. By using a whitelisting method in this manner, the industrial controller 12 may efficiently and simultaneously verify the identity and contents of each executable file prior to execution.

Figure 2:
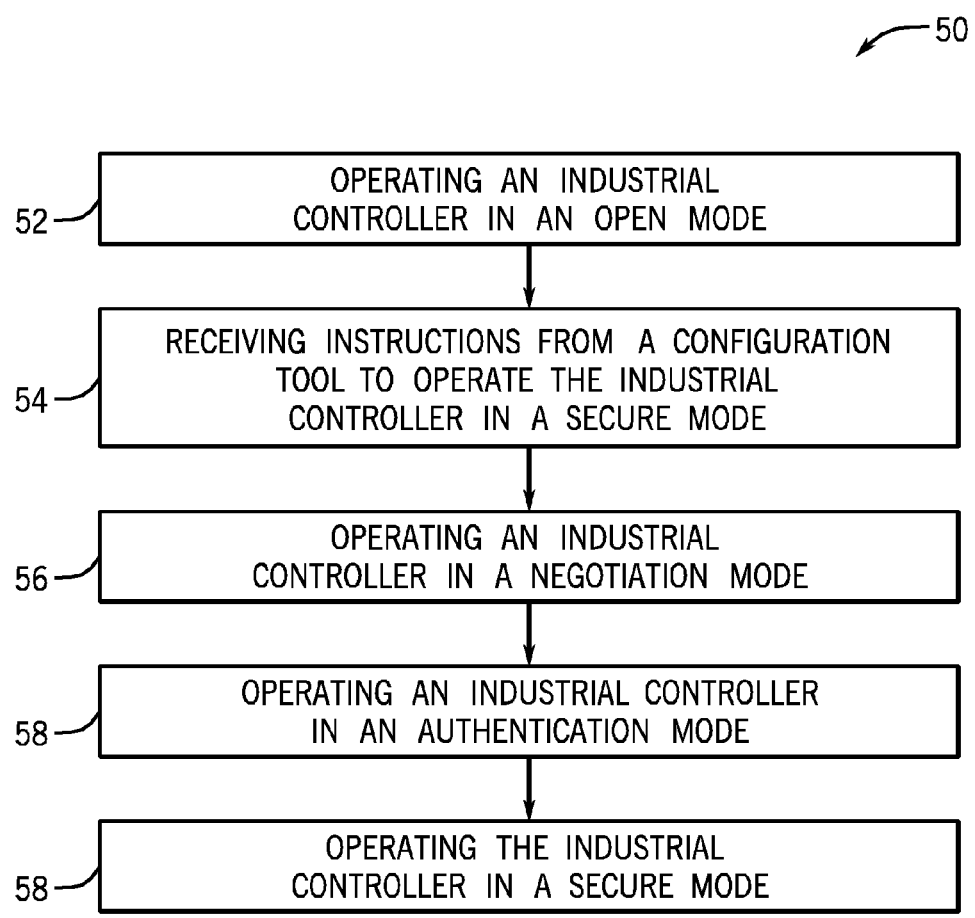
FIG. 2 is a flow diagram for an embodiment of a process by which the industrial controller may move from an open mode of operation to a secure mode of operation, in accordance with aspects of the present disclosure.

Accordingly, the presently disclosed embodiments may impose a number of security restrictions (e.g., in a step-wise fashion) to move the industrial controller 12 from an open mode of operation to a secure mode of operation. FIG. 2 is a flow diagram for an embodiment of a process 50 by which the industrial controller 12 may move from an open mode of operation to a secure mode of operation, in accordance with aspects of the present disclosure. The process 50 begins with the industrial controller 12 operating (block 52) in an open mode. Generally speaking, the open mode of operation of the industrial controller 12 does not restrict communication with the industrial controller, nor does it restrict the execution of executable files by the industrial controller. While operating in this open mode, the industrial controller 12 may receive (block 54) instructions from a configuration tool (e.g., ToolboxST 32 on device 24) to change the mode of operation of the industrial controller from the open mode to a secure mode.

Figure 3:
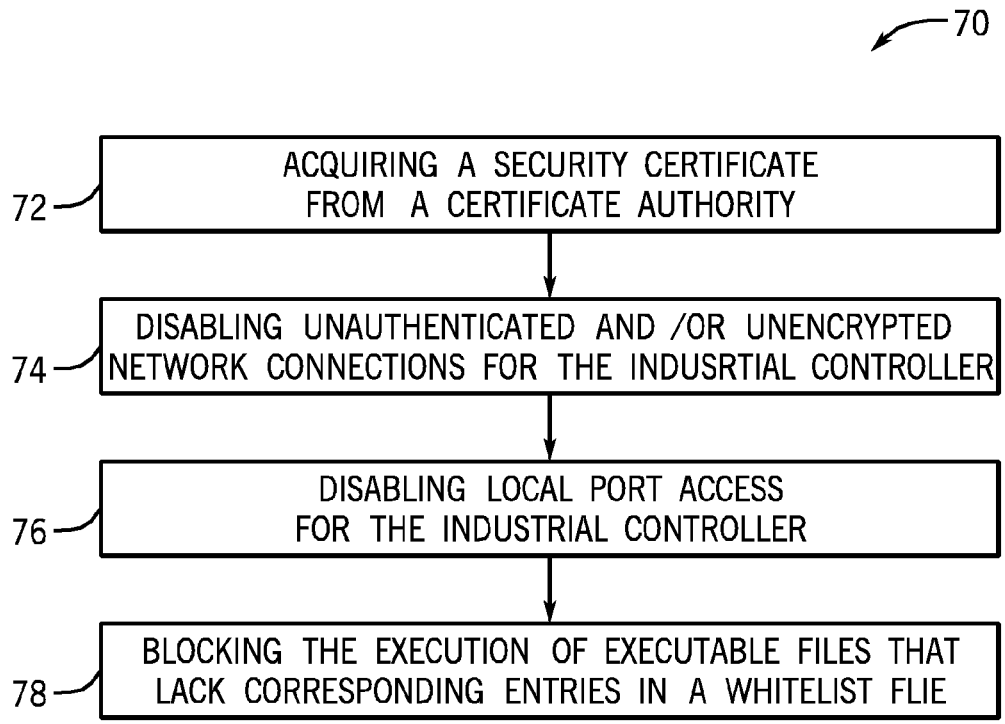
FIG. 3 is a flow diagram for an embodiment of a process which the industrial controller may perform in negotiation mode, in accordance with aspects of the present disclosure.
Figure 4:
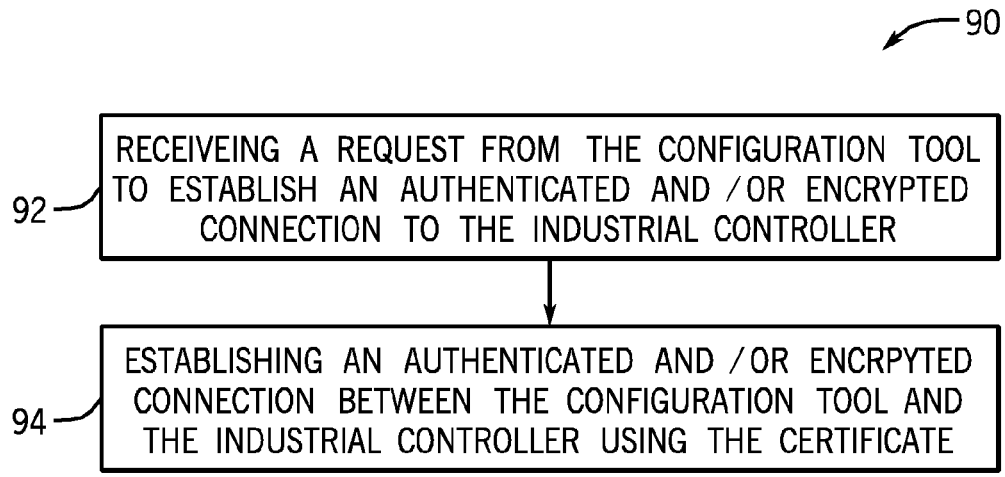
FIG. 4 is a flow diagram for an embodiment of a process which the industrial controller may perform in authentication mode, in accordance with aspects of the present disclosure.

In response to receiving the instructions from the configuration tool (e.g., ToolboxST 32 on device 24) to operate the industrial controller 12 in a secure mode, the industrial controller may switch to operating (block 56) in a negotiation mode. Generally speaking, during negotiation mode, the industrial controller 12 may generally prepare for secure mode operations. For example, turning to FIG. 3, a flow diagram is illustrated for an embodiment of a process 70 which the industrial controller 12 may perform in negotiation mode, in accordance with aspects of the present disclosure. The negotiation mode process 70 may begin with the industrial controller 12 acquiring (block 72) a security certificate from a certificate authority (e.g., certificate authority 44 on security server 38 via network 14). As discussed below with respect to FIG. 4, this certificate may later be used by the industrial controller 12 establish a secure (e.g., authenticated and/or encrypted) connection to, for example, ToolboxST 32. Next, the industrial controller 12 may disable (block 74) unauthenticated and/or unencrypted network connections for the industrial controller 12. That is, the processor 36 of the industrial controller 12 may execute one or more instructions that disable the connections, ports, and/or protocols associated with unauthenticated and/or unencrypted communication to the industrial controller. For example, in certain embodiments, the industrial controller 12 may disable file transfer protocol (FTP), Telnet, and/or any other unauthenticated or plain-text connections to the industrial controller 12 (e.g., via the network 14). Furthermore, the industrial controller 12 may disable (block 76) local port access (e.g., the ability to login and/or control the industrial controller 12 via local serial ports) for the industrial controller 12.

Additionally, as part of the negotiation mode process 70, the industrial controller 12 may also block the execution (block 78) of files that lack a corresponding entry in the whitelist file. That is, as set forth above, present industrial controller 12 embodiments may receive an encrypted whitelist file along with executable files for a particular software release. Furthermore, one of the executable files (e.g., a startup executable file) may include a private key value that may be used to decrypt the whitelist file. Then, when a particular executable file attempts execution, the industrial controller 12 may compare a hash key value for the executable attempting execution to the hash key values listed in the decrypted whitelist file. If the hash key value for an executable file is not located in the whitelist file, it may be blocked from execution. It should also be appreciated that, during the negotiation process, the industrial controller 12 may also verify that any executable files that began execution prior to the industrial controller 12 entering negotiation mode are authorized as well. That is, the industrial controller 12 may perform a verification of the executable files for all executable files that are currently executing on the industrial controller 12 when the industrial controller 12 enters negotiation mode.

Returning to FIG. 2, once the industrial controller 12 has completed negotiation mode (block 56), the industrial controller 12 may begin operating (block 58) in an authentication mode. Generally speaking, the authentication mode establishes secure (e.g., authenticated and/or encrypted) communication between the industrial controller 12 and the configuration tool (e.g., ToolboxST 32 on the device 24). For example, turning to FIG. 4, a flow diagram is illustrated for an embodiment of a process 90 which the industrial controller 12 may perform in authentication mode, in accordance with aspects of the present disclosure. The illustrated process 90 begins with the industrial controller 12 receiving (block 92) a request from the configuration tool (e.g., ToolboxST 32) to establish an authenticated and/or encrypted connection (e.g., a secure socket layer (SSL) connection) to the industrial controller 12. The process 90 continues with the industrial controller 12 establishing (block 94) the authenticated and/or encrypted connection between the configuration tool (e.g., ToolboxST 32) and the industrial controller 12.

Turning once more to FIG. 2, after the industrial controller 12 has completed authentication mode (block 58), the industrial controller 12 may begin operating (block 60) in secure mode. It should be appreciated that the security restrictions imposed on the industrial controller during the negotiation and authentication modes (e.g., as set forth in FIGS. 3 and 4) may continue to apply in secure mode. That is, when the industrial controller 12 is operating in secure mode, authenticated and/or unencrypted communication (e.g., FTP, Telnet, local port communication) to the industrial controller may be prohibited, and all executable files may be verified against the whitelist file to ensure that they are authorized prior to execution. It should also be appreciated that, the secure mode may persist in the industrial controller 12 throughout power cycling and/or software upgrades. For example, in certain embodiments, as the industrial controller 12 is rebooting, it may encounter a variable in memory indicating that the industrial controller 12 was being operated in a secure mode prior power cycling. As such, during the reboot process, the industrial controller 12 may generally perform the actions of the negotiation mode (e.g., process 70 of FIG. 3) to apply the desired security restrictions (e.g., before the industrial controller 12 begins to control the industrial control system 10). Accordingly, the industrial controller 12 may begin operations in the secure mode (e.g., only accepting encrypted connections from ToolboxST 32 and only executing authorized executable files).

Technical effects of this disclosure include an improvement to the overall security of the industrial control system 10. That is, presently disclosed embodiments enable operating the industrial controller 12 in a secure mode that may generally block the execution of unauthorized executable files and/or block access to the industrial controller by unauthorized persons or systems. Additionally, the presently disclosed embodiments enable the industrial controller 12 to move from an open mode (e.g., without restrictions) to the secure mode (e.g., with additional security restrictions) by gradually applying a number of security restrictions to the industrial controller 12. By enabling the industrial controller 12 to operate in a secure mode that persists across the various activities of the industrial controller 12 (e.g., power cycles, software downloads, and/or software upgrades), the presently disclosed embodiments generally provide an industrial control system 10 having reduced risk of unauthorized access and/or the execution of unauthorized instructions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of securing an industrial control system, comprising:

operating the industrial control system in an open mode, wherein communications between two devices of the industrial control system are unencrypted when the industrial control system is in the open mode;

operating the industrial control system in a negotiation mode, wherein each of the two devices acquires a respective security token from a server of the industrial control system and exchanges the respective security token with the other of the two devices when the industrial control system is in the negotiation mode; and ceasing operating the industrial control system in the open mode or the negotiation mode and instead operating the industrial control system in a secure mode, wherein the communications between the two devices of the industrial control system are encrypted using the security tokens when the industrial control system is operating in the secure mode.

2. The method of claim 1, wherein each of the two devices acquires a respective certificate as the respective security token from a certificate authority (CA) hosted by the server.

3. The method of claim 1, wherein at least one of the two devices is a human machine interface (HMI) system, a manufacturing execution system (MES), a supervisor control and data acquisition (SCADA) system, or a distributed control system (DCS), or a combination thereof.

4. The method of claim 1, wherein at least one of the two devices is a device hosting an industrial control system configuration application.

5. The method of claim 1, wherein at least one of the two devices is an industrial controller.

6. The method of claim 1, wherein at least one of the two devices is a field device configured to perform at least one measurement of the operation of a monitored system.

7. The method of claim 6, wherein the monitored system comprises a gas turbine system, an automated manufacturing system, a petroleum refinery system, a chemical production system, a gasification system, an automated power generation system, a power plant, a steam turbine system, or a wind turbine system, or a combination thereof.

8. A method of securing an industrial control system, comprising:

transmitting unencrypted data from a processor of a first device of an industrial control system to a processor of a second device of an industrial control system;

requesting, via the processor of the first device, a first security token from a server of the industrial control system;

receiving, at the processor of the first device, the first security token from the server of the industrial control system;

sending, via the processor of the first device, the first security token to the processor of the second device;

receiving, via the processor of the first device, a second security token from the processor of the second device; and ceasing transmitting unencrypted data and subsequently only transmitting encrypted data from the processor of the first device to the processor of the second device of the industrial control system, wherein the encrypted data is encrypted based on the first and second security tokens.

9. The method of claim 8, wherein the first and second security tokens comprise certificates including at least one key.

10. The method of claim 9, comprising generating the encrypted data based on the at least one key of the first and second security tokens.

11. The method of claim 8, comprising: verifying, via the processor of the first device, an identity of the second device using the second security token.

12. The method of claim 8, wherein the first device comprises a human machine interface (HMI) system and the second device comprises an industrial controller.

13. The method of claim 8, wherein the first device comprises a device hosting an industrial control system configuration application and the second device comprises an industrial controller.

14. The method of claim 8, wherein the first device comprises a field device and the second device comprises an industrial controller.

15. The method of claim 8, wherein transmitting the encrypted data from the processor of the first device to the processor of the second device comprises establishing a secure channel between the first and second devices and using the secure channel to transmit the encrypted data between the first and second devices.

16. A system, comprising:

an industrial control network comprising a plurality of devices that includes an industrial controller, wherein the plurality of devices is configured to:

receive respective security tokens from a server of the industrial controller;

exchange respective security tokens between the plurality of devices over the industrial control network;

cease exchanging unencrypted data over the industrial control network; and exchange encrypted data over the industrial control network, wherein the encrypted data is generated based on the respective security tokens.

17. The system of claim 16, wherein the plurality of devices includes a device hosting an industrial control system configuration application.

18. The system of claim 16, wherein the plurality of devices includes a human machine interface (HMI) system, manufacturing execution system (MES), a supervisor control and data acquisition (SCADA) system, or a distributed control system (DCS), or a combination thereof.

19. The system of claim 16, wherein the server comprises a certificate authority (CA) configured to generate respective certificates for the plurality of devices as the respective security tokens of the plurality of devices.

20. The system of claim 16, wherein each of the plurality of devices is configured to perform mutual authentication using the respective security tokens of other devices of the plurality of devices.

21. The system of claim 16, wherein the plurality of devices is configured to use the respective security tokens to establish at least one secure channel over the industrial control network.

* * * * *